(12) United States Patent
McLeran et al.

(10) Patent No.: US 10,613,982 B1
(45) Date of Patent: Apr. 7, 2020

(54) FILE-AWARE CACHING DRIVER

(75) Inventors: Daniel Robert McLeran, Loveland, CO (US); Joe David Marley, Longmont, CO (US); Scott J Noone, Amherst, NH (US); Peter G Viscarola, Mont Vernon, NH (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 1838 days.

(21) Appl. No.: 13/440,450

(22) Filed: Apr. 5, 2012

Related U.S. Application Data

(60) Provisional application No. 61/584,188, filed on Jan. 6, 2012, provisional application No. 61/584,195, filed on Jan. 6, 2012, provisional application No. 61/584,196, filed on Jan. 6, 2012, provisional application No. 61/584,197, filed on Jan. 6, 2012, provisional application No. 61/584,201, filed on Jan. 6, 2012, provisional application No. 61/584,204, filed on Jan. 6, 2012.

(51) Int. Cl.
*G06F 12/0862* (2016.01)

(52) U.S. Cl.
CPC .... *G06F 12/0862* (2013.01); *G06F 2212/602* (2013.01); *G06F 2212/6028* (2013.01)

(58) Field of Classification Search
None
See application file for complete search history.

(56) References Cited

U.S. PATENT DOCUMENTS

| 6,389,427 | B1 | 5/2002 | Faulkner |
| 6,463,509 | B1 * | 10/2002 | Teoman .............. G06F 9/4401 711/113 |
| 6,625,150 | B1 * | 9/2003 | Yu .......................... H04L 47/10 370/230 |
| 6,842,510 | B2 | 1/2005 | Sakamoto |
| 7,421,710 | B2 | 9/2008 | Qi et al. |
| 7,457,880 | B1 | 11/2008 | Kim |
| 7,464,246 | B2 | 12/2008 | Gill |

(Continued)

OTHER PUBLICATIONS

Non-Final Office Action, dated Dec. 20, 2013, U.S. Appl. No. 13/440,228, filed Apr. 5, 2012, Temporal File Defragment Daniel Robert McLeran.

(Continued)

*Primary Examiner* — Jared I Rutz
*Assistant Examiner* — Marwan Ayash
(74) *Attorney, Agent, or Firm* — Setter Roche LLP; Christian W Best (57) ABSTRACT

The disclosure is related to file-aware caching for data storage devices. In one example, a device may comprise a data storage medium, an interface circuit to communicate with a host, and a driver configured to retrieve file system information related to a structured input/output (I/O) command from the host, and select caching attributes based on the file system information. Further, a system may include a host and at least one driver operating on the host; the driver configured to intercept a I/O request initiated at the host, obtain operating system information from the host about the I/O request, and store the operating system information that it is accessible to a data storage device to allow the data storage device to implement caching attributes based on the operating system information.

5 Claims, 4 Drawing Sheets

(56) References Cited

U.S. PATENT DOCUMENTS

| | | | |
|---|---|---|---|
| 7,464,250 B2 * | 12/2008 | Dayan | G06F 12/0862 |
| | | | 711/112 |
| 7,526,598 B2 | 4/2009 | Stern et al. | |
| 7,620,620 B1 | 11/2009 | Sedlar | |
| 7,620,773 B2 | 11/2009 | Nicholson | |
| 7,826,161 B2 | 11/2010 | Riedel | |
| 7,853,361 B2 | 12/2010 | Nielsen | |
| 8,019,938 B2 | 9/2011 | Flynn | |
| 8,051,044 B1 * | 11/2011 | Dyatlov | G06F 11/1451 |
| | | | 707/625 |
| 8,064,464 B2 | 11/2011 | Knazik | |
| 8,065,470 B2 | 11/2011 | Yano | |
| 8,073,674 B2 | 12/2011 | Gehr et al. | |
| 8,166,164 B1 | 4/2012 | Luna | |
| 8,499,120 B2 | 7/2013 | Furuhjelm | |
| 2003/0014603 A1 * | 1/2003 | Sasaki et al. | 711/158 |
| 2005/0125844 A1 * | 6/2005 | Maruyama et al. | 725/135 |
| 2005/0232153 A1 * | 10/2005 | Bishop et al. | 370/235 |
| 2006/0031422 A1 * | 2/2006 | Totolos, Jr. | 709/219 |
| 2006/0031633 A1 * | 2/2006 | Zohar et al. | 711/113 |
| 2006/0050714 A1 | 3/2006 | Blasco-Claret | |
| 2006/0075164 A1 * | 4/2006 | Ooi | G06F 13/385 |
| | | | 710/58 |
| 2006/0112232 A1 * | 5/2006 | Zohar et al. | 711/137 |
| 2007/0136541 A1 | 6/2007 | Herz | |
| 2008/0016273 A1 | 1/2008 | Dayan | |
| 2008/0140921 A1 | 6/2008 | Sutardja et al. | |
| 2008/0162821 A1 | 7/2008 | Duran et al. | |
| 2008/0307158 A1 * | 12/2008 | Sinclair | G06F 12/0246 |
| | | | 711/103 |
| 2008/0307192 A1 * | 12/2008 | Sinclair | G06F 12/0246 |
| | | | 711/218 |
| 2009/0112931 A1 * | 4/2009 | Wang | H04N 19/46 |
| 2009/0132760 A1 * | 5/2009 | Flynn et al. | 711/113 |
| 2010/0023712 A1 * | 1/2010 | Yamaguchi et al. | 711/158 |
| 2010/0082936 A1 | 4/2010 | Hobbet et al. | |
| 2010/0153474 A1 | 6/2010 | Raines | |
| 2010/0169540 A1 * | 7/2010 | Sinclair | G06F 12/0246 |
| | | | 711/103 |
| 2011/0185043 A1 | 7/2011 | Zeller | |
| 2011/0295915 A1 * | 12/2011 | Ejiri et al. | 707/821 |
| 2011/0295934 A1 | 12/2011 | McCormack et al. | |
| 2012/0210066 A1 | 8/2012 | Joshi et al. | |
| 2012/0210068 A1 | 8/2012 | Joshi et al. | |
| 2012/0215965 A1 | 8/2012 | Inada | |
| 2012/0221774 A1 | 8/2012 | Atkisson et al. | |
| 2014/0025868 A1 | 1/2014 | Furuhjelm | |
| 2014/0075143 A1 | 3/2014 | Matsuya | |
| 2014/0297937 A1 | 10/2014 | Thomas et al. | |
| 2015/0012660 A1 | 1/2015 | Kuulusa | |

OTHER PUBLICATIONS

Non-Final Office Action, dated Dec. 23, 2013, U.S. Appl. No. 13/440,022, filed Apr. 5, 2012, Smart File Location, Daniel Robert McLeran.

Non-Final Office Action, dated Jan. 7, 2014, U.S. Appl. No. 13/440,245, filed Apr. 5, 2012, Cache File Preloading, Daniel Robert McLeran.

Non-Final Office Action, dated Apr. 26, 2013, U.S. Appl. No. 13/440,332, filed Apr. 5, 2012, File-Aware Priority Driver, Daniel Robert McLeran.

Final Office Action, dated Oct. 25, 2013, U.S. Appl. No. 13/440,332, filed Apr. 5, 2012, File-Aware Priority Driver, Daniel Robert McLeran.

Advisory Action, dated Jan. 15, 2014, U.S. Appl. No. 13/440,332, filed Apr. 5, 2012, File-Aware Priority Driver, Daniel Robert McLeran.

Non-Final Office Action, dated Apr. 26, 2013, U.S. Appl. No. 13/440,285, filed Apr. 5, 2012, High Priority Read and Write, Daniel Robert McLeran.

Non-Final Office Action, dated Oct. 24, 2013, U.S. Appl. No. 13/440,285, filed Apr. 5, 2012, High Priority Read and Write, Daniel Robert McLeran.

Non-Final Office Action, dated Jan. 15, 2014, U.S. Appl. No. 13/440,285, filed Apr. 5, 2012, High Priority Read and Write, Daniel Robert McLeran.

Final Office Action, dated Feb. 25, 2014, U.S. Appl. No. 13/440,285, filed Apr. 5, 2012, High Priority Read and Write, Daniel Robert McLeran.

OpenAFS for Windows Requested Features and Road Map, Secure Endpoints, Sep. 16, 2011, New York.

Jennings, Apple Fusion Drive Isn't SSD Cache, But Is Lots of Cash, Forbes.com, Oct. 25, 2012, US.

Pace, Hybrid Hard Drives Explained, Yahoo, Oct. 31, 2009, Joanne Pace.

Otoo and Rotem and Seshadri, Efficient Algorithms for Multi-File Caching, In 15th International Conference Database and Expert Systems Applications, 2004,Lawrence Berkeley National Laboratory, Berkeley.

Shoshani and Sim and Gu, Storage Resource Managers: Middleware Components for Grid Storage (2002).

Frost and Mammarella and Kohler and Reyes and Hovepian and Matsuoka and Zhang,Generalized File System Dependencies, Proc. of ACM Symposium on Operating System Principles, 2007, pp. 307-320.

Oracle Development and Configuration, http://www.osmosislatina.com/oracle/part4_2.htm, Osmosis Latina, 2011.

Microblaze Processor Reference Guide, www.xilinx.com/support/documentation/sw_manuals/mb_ref_guide.pdf, Xilinx, 2008.

Wehman, File Associated Pinning, U.S. Appl. No. 13/832,505, filed Mar. 15, 2013.

Wehman, User Selectable Caching, U.S. Appl. No. 13/832,585, filed Mar. 15, 2013.

* cited by examiner

FILE-AWARE CACHING DRIVER

CROSS REFERENCE TO RELATED APPLICATIONS

The present application claims priority to U.S. provisional patent application Ser. No. 61/584,188, filed Jan. 6, 2012, entitled "Smart File Location;" Ser. No. 61/584,195, filed Jan. 6, 2012, entitled "Temporal File Defragment;" Ser. No. 61/584,196, filed Jan. 6, 2012, entitled "Cache File Preloading;" Ser. No. 61/584,197, filed Jan. 6, 2012, entitled "File-Aware Caching Driver;" Ser. No. 61/584,201, filed Jan. 6, 2012, entitled "File-Aware Priority Driver;" and Ser. No. 61/584,204, filed Jan. 6, 2012, entitled "High Priority Read and Write," the contents of which are hereby incorporated by reference in their entirety.

BACKGROUND

The performance of data storage devices (DSDs) may be limited by the information available to the device from a host system. In some data storage systems, the data storage device receives very limited information from the host, such as file size and a Logical Block Address. Therefore, systems and methods are needed for improving data storage device performance.

SUMMARY

A device may comprise a data storage medium, an interface circuit to communicate with a host, and a driver configured to retrieve file system information related to a structured input/output (I/O) command from the host, select caching attributes based on the file system information, and store selected data in a cache based on the caching attributes.

In another embodiment, a system may comprise a host device and at least one driver operating on the host device configured to intercept a data input/output (I/O) request from the host device to a data storage device, obtain information from the host device about the I/O request, assign caching attributes to the I/O request based on the information, and store the caching attributes to a table accessible to the data storage device.

Another embodiment may be a method comprising inspecting characteristics of a data input/output (I/O) request, choosing caching attributes for the I/O request based on the characteristics and user-defined settings, and selecting data to store in a cache memory based on the caching attributes.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Host devices may send data read or write requests to data storage devices in the form of structured input/output (I/O) commands or requests. As used herein, a structured command is a command defined by an interface-standard command format, such as a read or write command of an data storage interface standard (such as SATA) A structured command must be in the form of a data structure compatible with the interface of a data storage device. Operating system information (or file system information), such as information specific to files or operation threads, are not included as part of the structured I/O command request. A thread may be a unit of processing on an operating system, such that a single application may consist of numerous threads running simultaneously.

Data storage devices may benefit from receiving additional information about a file or I/O operation thread from a host system. This may be improved by using drivers to communicate between devices. Drivers can be computer programs designed to facilitate communication or interaction between applications or other programs and hardware devices (e.g. between a host computer application and a data storage device). A kernel may be a part of the operating system that acts as a "bridge" between computer applications and the hardware devices of a system, such as the CPU, memory, and other hardware components. In some embodiments, systems may be improved by a system of drivers operating in the kernel of the host operating system to collect or retrieve data about a file or input/output (I/O) operation thread, and associate corresponding caching attributes with the file or operation. The data storage device can use the caching attributes set by the drivers to make informed decisions regarding files or operations, potentially improving response times, reducing latency, or otherwise improving device performance. As an example, file or thread data could be used to select files or information to store in a system's cache for faster access, and this could include caching files not specifically requested by the I/O operation.

Figure 1:
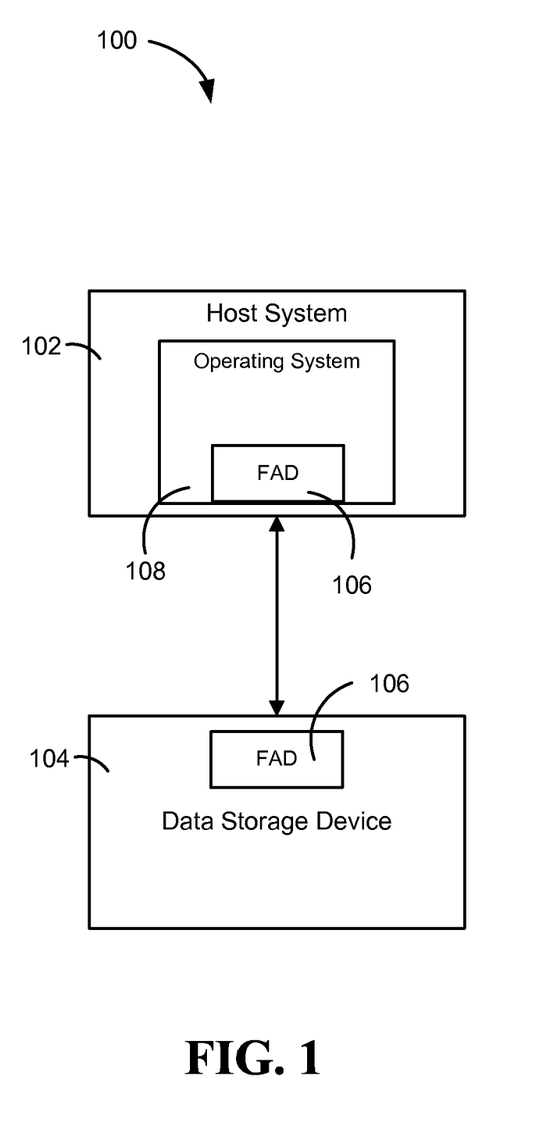
FIG. 1 is a diagram of an illustrative embodiment of a system of file-aware caching drivers.

FIG. 1 depicts an embodiment of a system for file-aware caching drivers generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The host 102 can include one or more file-aware drivers (FAD) 106. The FAD 106 may be drivers running in the kernel of the operating system 108 of the host 102 and may facilitate operations between the host 102 and the DSD 104. The FAD 106 can comprise software running on the host device, configurable controllers, or circuits designed to implement the functions described herein. In some embodiments, some or all of the FAD 106 may be incorporated into the DSD 104. For example, a caching policy engine driver could be incorporated on the DSD 104, while a file system filter driver and a table driver could be implemented on the host 102.

When the host 102 transmits a structured input/output (I/O) command to the DSD 104, the FAD 106 can monitor or intercept file activity in the operating system 108, including data about files themselves or the applications or threads utilizing or requesting the files. This file system data may be used by the FAD 106 or DSD 104 to improve performance or operability between the host 102 and the DSD 104. For example, the FAD 106 may send the data to the DSD 104 directly, or use the data to assign caching attributes to the I/O command or associated file. These file system data or caching attributes can be sent to the DSD 104 as part of or separately from the structured I/O command itself. The DSD 104 may use the data or caching attributes to intelligently determine which files to store in a cache for quick access by the host 102.

Figure 2:
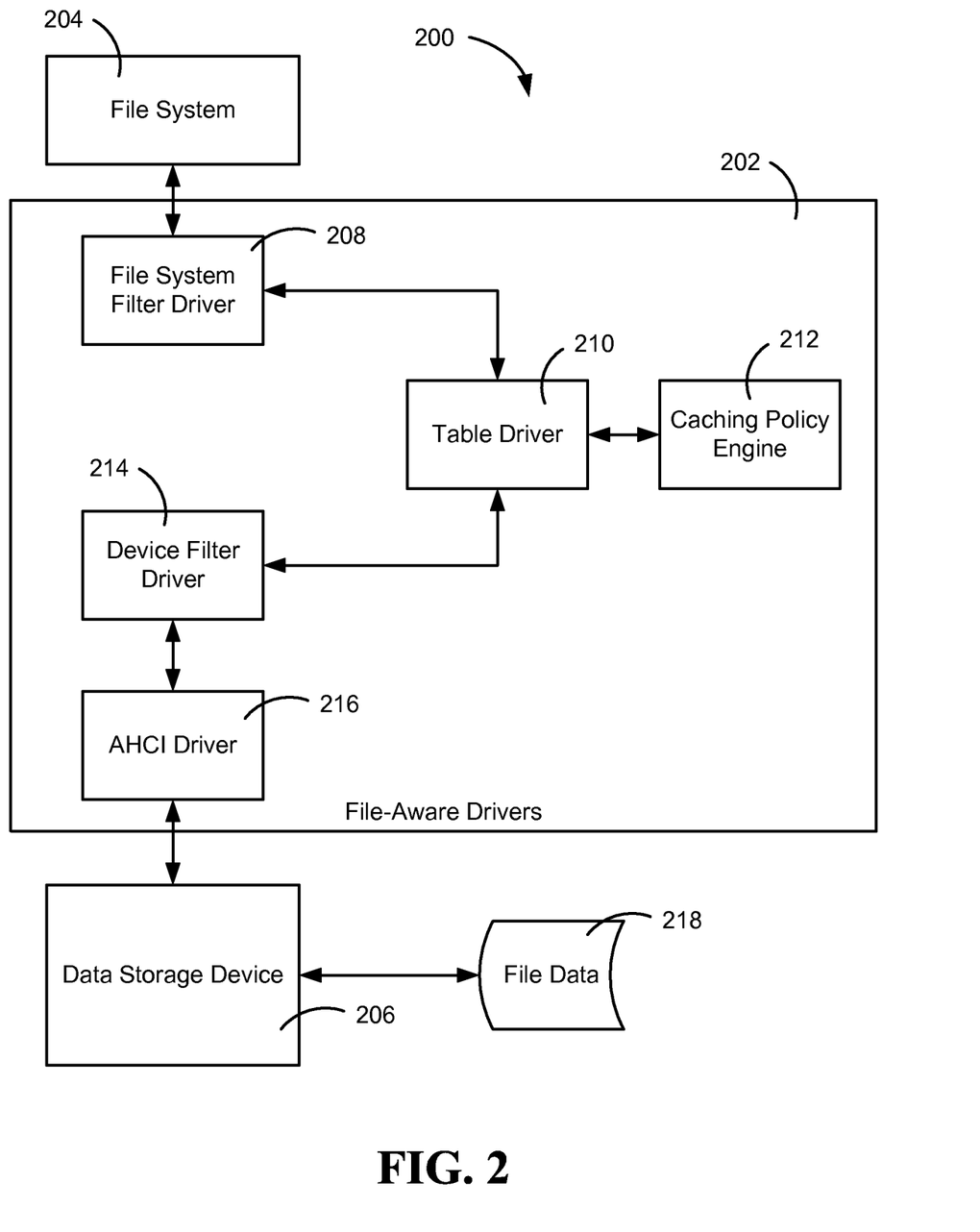
FIG. 2 is a diagram of an another illustrative embodiment of a system of file-aware caching drivers.

FIG. 2 depicts a diagram of a system with file-aware drivers generally designated 200. The system 200 may include one or more file-aware drivers (FAD) 202, a file system 204, and a data storage device (DSD) 206 which can store, retrieve, or modify data file(s) 218. The file system 204 may be the file system of a host device, used for organizing, storing, and retrieving data. Example file systems may include FAT, NTFS, or HFS Plus. The DSD 206 may be any of the devices listed for the data storage device 104, or any other device for data storage.

In the embodiment depicted in FIG. 2, the file-aware drivers (FAD) 202 may consist of a system of device drivers running in the operating system of a host device, which system may include a file system filter driver 208, a table driver 210, a caching policy engine 212, a device filter driver 214, and an Advanced Host Controller Interface (AHCI) driver 216. In some embodiments, the FAD 202 may be software, one or more programmable controllers, circuits, CPUs, or any combination of elements capable of detecting attributes of file activity within a system and associating these attributes with files or I/O operations in such a way as to affect a behavior of the data storage device 206.

The file system 204 may initiate I/O requests to read or write data to the data storage device 206. The file system filter driver 208 can interact with the file system 204 to intercept or retrieve file activity from the operating system. This may include gathering information about file(s) such as the file name, file path, file extension, file size, or logical block address (LBA) for the entire file. The intercepted file activity may also include other information, such as the system power source (e.g. A/C power or battery power), or the name or identifier (e.g. the type of accessing program, such as .exe or .dll) of the accessing executable, other information, or any combination thereof. The file system filter driver 208 may then pass relevant file information to the caching policy engine 212 through the table driver 210.

As an example, the host operating system may initiate a structured I/O command requesting a block of file data 218 from the DSD 206 using a logical block address (LBA) associated with the block of data. The file system filter 208 may determine the file path and file size of the file associated with the requested data 218, as well as the type of program requesting the data. In one example, this file system information associated with the structured I/O command may be passed along with the data I/O request to the caching policy engine 212 by way of the table driver 210. In addition, the file system filter 208 may determine other information available to a host operating system that is not part of a structured I/O command.

The table driver 210 may maintain the relationship between a file or piece of data 218, the thread ID of the processing thread requesting the input/output (I/O) operation, and the file information from the file system filter driver 208 or the caching attributes set by the caching policy engine 212. In some embodiments, the table driver 210 may only maintain the relationship between the file and the file information, or between the thread ID and the file information. The table driver 210 may maintain these relationships in a table, database, self-contained data packets, other formats, or a combination thereof.

The caching policy engine (CPE) 212 can inspect the information collected by the file system filter driver, such as file extension, file size, file path, creation attributes, and the name of the accessing executable. This information may be sent to the CPE 212 by the table driver 210, or the CPE 212 may independently inspect a table, database, or other data structure maintained by the table driver 210. Upon inspection of the file properties, the CPE 212 can determine whether to set caching attributes for the current file and/or I/O operation thread immediately, or to delay setting caching attributes until later. For example, if file information is unavailable or insufficient at the file system filter driver 208 level, the CPE 212 may request to be called again at the device driver filter 214 level. Furthermore, caching attributes may be set at one or more points in the lifecycle of a file object, such as on first access of the file, subsequent accesses, pre-read, pre-write, or other points. When caching attributes have been set, the table driver 210 may then update to maintain the relationship between the file or operation thread and the caching attributes set by the CPE 212.

The caching attributes set by the CPE 212 can be used to determine which files should be kept available in a system's cache for faster access, or for other operations of the data storage device 206. The CPE 212 may select caching attributes based upon configurable settings. For example, a user of the host system 102 or data storage device 104 may be able to configure which types of attributes, files, or program requests have higher priority for caching purposes, such as prioritizing caching data from I/O operations from .exe executable programs. In some embodiments, the CPE 212 may have programmed or automatic settings on how to assign caching attributes. In other embodiments, the CPE 212, the system of drivers 202, or the data storage device 206 may be configured to monitor file usage and data access and modify caching policies according to usage.

In some embodiments, users may be able to select or designate files or data to keep in the cache memory. For example, a user may be able to set that a file be stored, or "pinned," in cache, such as for quick access or higher reliability. Also, the user may select the pinned files be stored in the cache for a set specified period of time (e.g. one week), for a specified period of time since the last time the file was accessed (e.g. kept in the cache for one week after the last access of the file), for other periods or under other criteria, or a combination thereof. A user may designate that specific files should be pinned, or may apply pinning rules to classes of file or data. For example, a user may specify that all .doc word processor documents should be stored in cache for three days after their last access, or that all files stored in a certain directory are stored in cache. Such user selections and designations can control or influence the functioning of the file-aware drivers to affect the caching behavior of a data storage device.

If the caching attributes have already been set by the caching policy engine (CPE) 212, the device filter driver 214 may retrieve the caching attributes from the table driver 210. If the CPE 212 has not yet set the caching attributes, the device filter driver 214 may request caching attributes from the CPE 212 through the table driver 210. The device filter driver 214 may provide any additional available information to the CPE 212 to facilitate the selection of caching attributes. Once selected, the device filter driver 214 can pass the caching attributes to the Advanced Host Controller Interface (AHCI) driver 216. Depending on the type of ACHI driver 216 in the system, the device filter driver 214 may do this by placing the caching attributes into a Small Computer System Interface (SCSI) Request Block (SRB), a Command Descriptor Block, or other block of data and instructions for the data storage device (DSD) 206 recognized by the AHCI driver 216.

The Advanced Host Controller Interface (AHCI) driver 216 can receive the caching attributes from the device filter driver 214. If the caching attributes were sent as part of an SCSI Request Block (SRB) or similar data block, the AHCI driver 216 can copy out the attributes. The AHCI driver may then pass the caching attributes to the data storage device 206. As an example, the AHCI driver 216 may copy the caching attributes into a Frame Information Structure (FIS), which is a block of data for Direct Memory Access (DMA) reads and writes. The caching attributes may be sent to the data storage device separate from the structured I/O command issued by the host.

After receiving the caching attributes, the data storage device 206 may use the attributes to determine caching behavior or for other functions. For example, it may use the caching attribute values to determine a priority for caching data, with certain caching attribute values resulting in immediate or high-priority caching, and other values resulting in low-priority caching.

The system of FAD 202 depicted in FIG. 2 is an illustrative embodiment only, and it should be apparent to one skilled in the art that the functions described could be performed by more or fewer drivers, or that some functionality could be implemented as part of the data storage device rather than in the host system. For example, a single driver could perform all the functions of obtaining file information, assigning caching attributes, maintaining an association table, and passing the information to a data storage device. Alternately, drivers could obtain file information and pass it to a data storage device, where caching attributes would then be selected. In other embodiments, file system information could be determined and stored in a table on the host. The data storage device could access and retrieve the file system information from the host and set caching attributes based on the file system information. Removing, adding, consolidating, or restructuring the drivers could eliminate the need for some functions or behaviors described herein, or add additional requirements.

Figure 3:
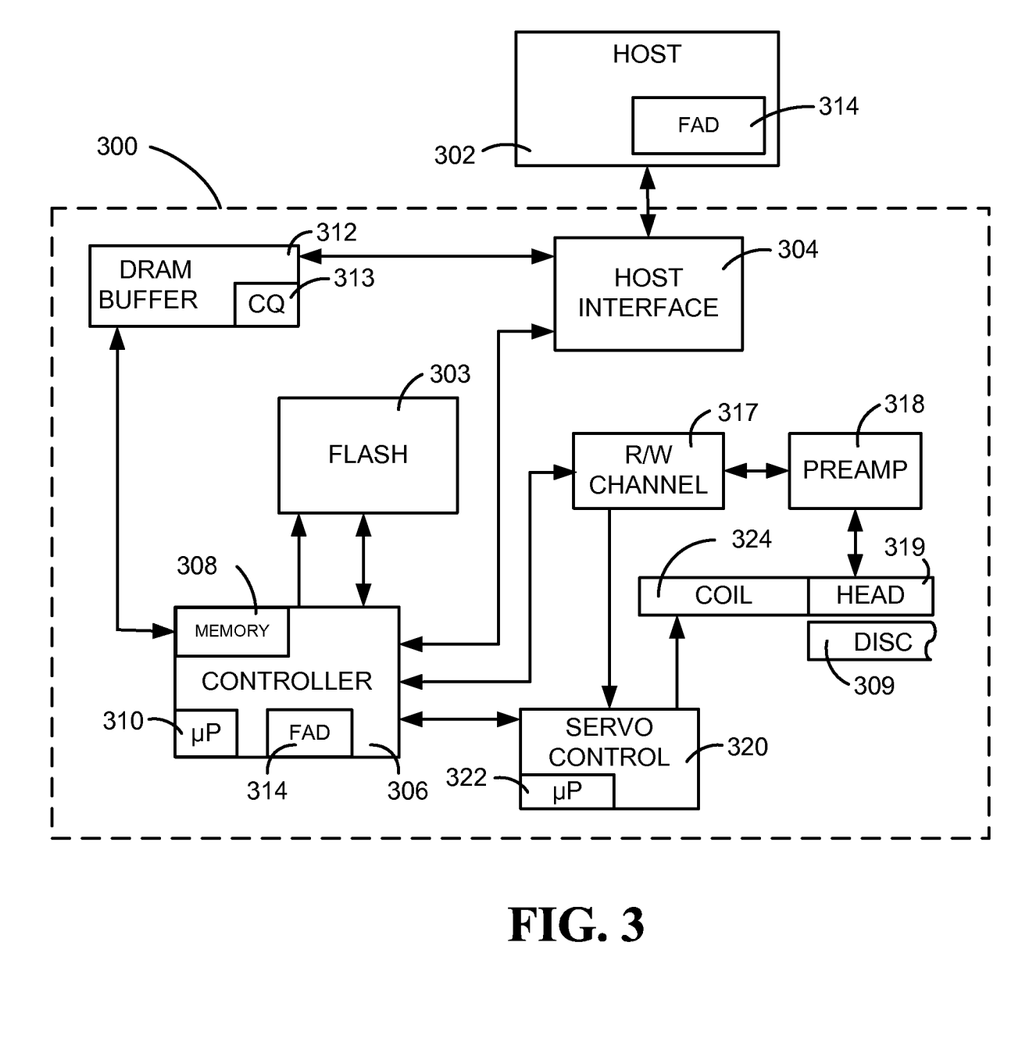
FIG. 3 is a diagram of a an illustrative embodiment of a data storage device employing file-aware caching drivers.

FIG. 3 is a diagram of another illustrative embodiment of a system utilizing file-aware drivers (FAD), generally designated 300. Specifically, FIG. 3 provides a functional block diagram of a disc drive data storage device (DSD) 300. The DSD 300 may be a data storage device such as the device 104 shown in FIG. 1. The data storage device 300 can communicate with a host device 302 (such as the host system 102 shown in FIG. 1) via a hardware/firmware based host interface circuit 304 that may include a connector (not shown) that allows the DSD 300 to be physically removed from the host 302. The buffer 312 can temporarily store user data during read and write operations and can include a command queue (CQ) 313 where multiple pending access operations can be temporarily stored pending execution. A nonvolatile solid state memory 303, such as Flash memory, can be included for additional cache or buffer memory, or to provide additional addressable data storage for the DSD 300. The DSD 300 can include a programmable controller 306 with associated memory 308 and processor 310. In some embodiments, the controller 306 may also include file-aware drivers (FAD) 314, or elements to perform one or more functions describes for FAD herein, such as using file information from the host 302 operating system to assign caching attributes.

Further, FIG. 3 shows the DSD 300 can include a read/write (R/W) channel 317, which can encode data during write operations and reconstruct user data retrieved from disc(s) 309 during read operations. A preamplifier/driver circuit (preamp) 318 can apply write currents to the head(s) 319 and provides pre-amplification of readback signals. A servo control circuit 320 may use servo data to provide the appropriate current to the coil 324 to position the head(s) 319 over the disc(s) 309. The controller 306 can communicate with a processor 322 to move the head(s) 319 to the desired locations on the disc(s) 309 during execution of various pending commands in the command queue 313.

The host 302 (or in some embodiments, the controller 306 or data storage device 300) may be loaded with a system of file-aware device drivers (FAD) 314. The FAD 314 can collect information from the host 302 about files or system threads requesting I/O operations, and use this information to assign caching attributes to the files or threads. These caching attributes may be sent to the DSD 300, which can use the attributes to determine what data should be loaded into the nonvolatile solid-state cache 303. Because data can be accessed from the nonvolatile solid-state cache 303 more quickly than reading the data from the disc(s) 309, intelligent data caching based on the caching attributes may increase the performance and response times of the data storage device 300.

Figure 4:
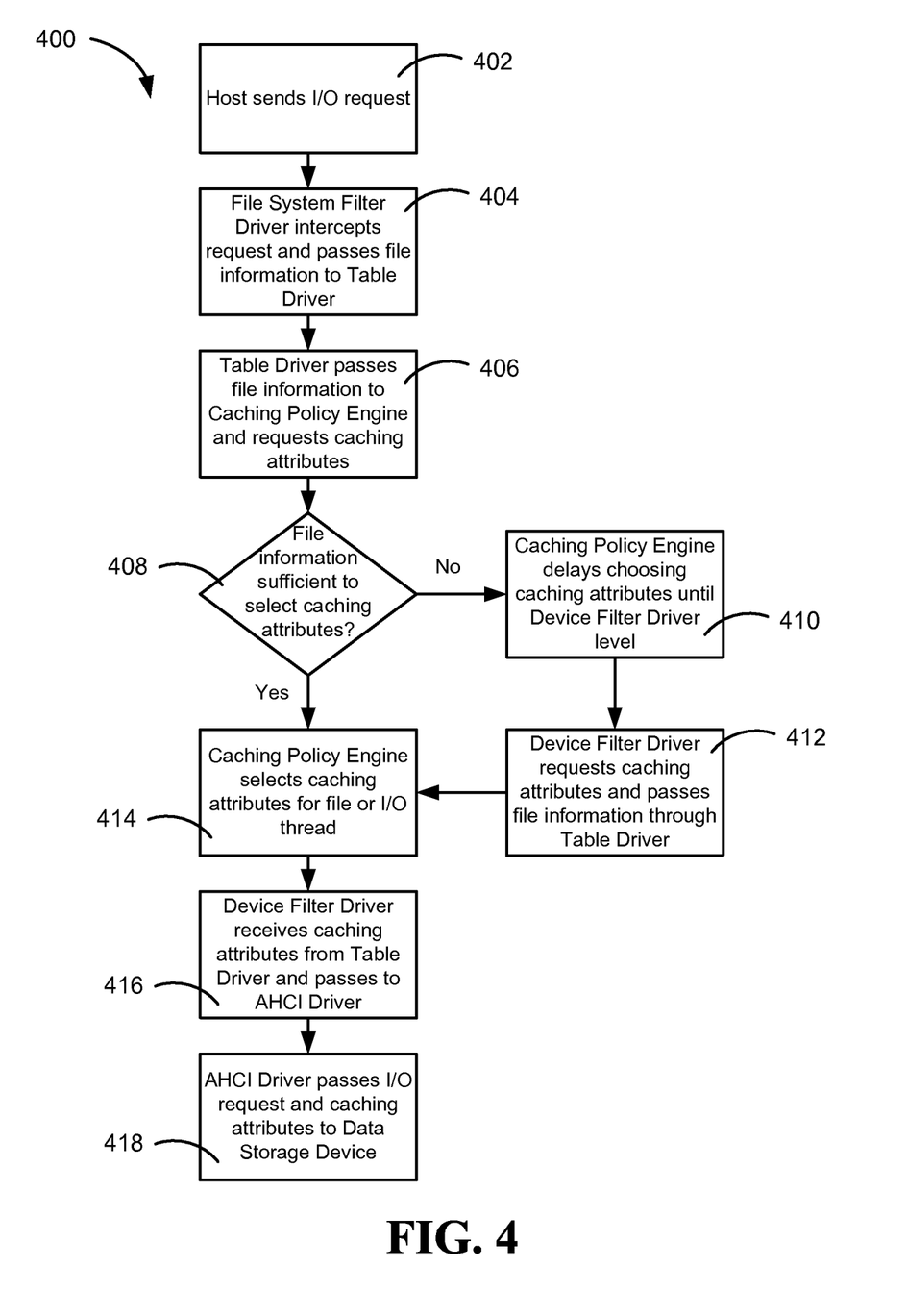
FIG. 4 is a flowchart of an illustrative embodiment of a method of employing file-aware caching drivers.

Turning now to FIG. 4, a flowchart of an illustrative embodiment of a method of employing file-aware caching drivers is shown and generally designated 400. The depicted method could be used in a system of file-aware drivers such as the system depicted in FIG. 2. The method 400 can involve a host system sending an input or output request (I/O request) to read data from or write data to a data storage device, at 402. The request may originate from an application or program running on the host system, or from a particular application thread.

Once an I/O request has been initiated at 402, the method 400 may involve a file system filter driver intercepting the I/O request and passing information about the request to a table driver, at 404. The information passed by the file system filter driver may be about the file involved in the I/O request (e.g. file path, file extension, file size, or logical block address (LBA)), the requesting application or thread (e.g. the name of the program or type of application, such as .exe or .dll), other information (e.g. whether the system power source is A/C power or battery power), or any combination thereof. The file system filter driver may also instruct the table driver to request caching attributes from a caching policy engine.

The method 400 may next involve the table driver passing the information about the I/O request to a caching policy engine (CPE), and requesting that the CPE select caching attributes, at 406. The table driver may also maintain the relationship between the file involved in the I/O request, the requesting program, and the file information or caching attributes. In some embodiments, the table driver may maintain the relationship between, for example, the requested file and all the file information from the file system filter driver, and then later replace the file information with the caching attributes selected by the CPE. In other embodiments, the table driver may retain all available information even after caching attributes have been selected. In still other embodiments, the table driver may never maintain a list of all the available file information, and may simply pass the information to the CPE and retain only the selected caching attributes. It should be clear to one skilled in the art that the listed examples are illustrative only, and that there are many variations possible for accomplishing the methods disclosed herein that fall within the scope of the present invention.

After receiving information about a file or I/O request, the caching policy engine (CPE) may determine whether the information that has been provided is sufficient to select caching attributes, at 408. For example, certain information may be critical to selecting caching attributes, or may be useful for making optimal caching attribute decisions. The CPE may examine the available information and determine whether it is incomplete or otherwise insufficient to select caching attributes at this point. Whether the file information is sufficient may depend on the CPE's setting for selecting caching attributes. The CPE may select caching attributes based on user configurations, pre-programmed settings, file access and usage analysis, other factors, or any combination thereof.

If the CPE determines that the file information is insufficient at 408, the CPE may delay the selection of caching attributes until a later point, at 410. For example, the CPE may request to be called again by another driver in the system of drivers, such as the device filter driver. In such an embodiment, if the I/O request reaches the device filter driver level and the CPE has elected to delay the selection of caching attributes, the device filter driver may request the selection of caching attributes at 412. At 412, the device filter driver may also pass additional information about the I/O request or file to the CPE by way of the table driver. The device filter driver may have access to information not previously available to the CPE, or new information may otherwise have become available to the system of file-aware drivers that could aid in the selection of caching attributes. In some embodiments, new information may not be available or necessary, and caching attributes could be selected based on I/O size, logical block address(es) (LBAs), or other available information.

Once the CPE receives sufficient file information, it may select caching attributes to assign to the thread and/or file involved in the I/O request, at 414. The selection of caching attributes can occur if the initial file information provided to the CPE was sufficient at 408, or if the CPE delayed caching attribute selection until it was called at a later point, such as by the device filter driver at 412. The table driver may update the relation between the thread and/or requested file and the caching attributes.

Once caching attributes have been selected, the device filter driver may receive the attributes from the table driver and pass them to the Advanced Host Controller Interface (AHCI) driver at 416. The device filter driver may pass the caching attributes by placing them into a Small Computer System Interface (SCSI) Request Block (SRB), a Command Descriptor Block, or other block of data and instructions for the data storage device (DSD).

The AHCI driver may then pass the I/O request along with the corresponding caching attributes to the DSD, at 418. The I/O request and the caching attributes may be sent as a single command or data structure, or they may be passed to the DSD separately. The AHCI can accomplish this by putting the information into a data structure compatible with the architecture of the DSD. For example, the AHCI driver may copy the caching attributes into a Frame Information Structure (FIS) data block for Direct Memory Access (DMA) reads and writes. The DSD may then use the caching attributes to determine caching behavior or for other functions.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
   a host device including:
   an interface to communicate with a data storage device distinct from the host; and
   at least one driver running in a kernel of an operating system of the host device and configured to:
   monitor for and intercept a data input/output (I/O) request sent from the operating system to the data storage device;
   obtain information from the host device about the I/O request, wherein the at least one driver comprises a file system filter driver configured to intercept the I/O request from the host device and obtain data about the I/O request from the host device that is not transferred as part of the I/O request;
   assign caching attributes to the I/O request based on the information, the caching attributes identifying selected data for caching, wherein the at least one driver further comprises a caching policy engine configured to assign caching attributes to the I/O request based on the data from the host device;

store the caching attributes to a table accessible by the data storage device in a separate communication from the data I/O request, wherein the at least one driver further comprises a table driver configured to request caching attributes from the caching policy engine and maintain a relationship between the I/O request and the caching attributes in the table; and wherein the at least one driver further comprises an Advanced Host Controller Interface (AHCI) driver configured to place the I/O request and the caching attributes into data structures based on a communication standard of the data storage device, and send the data structures to the data storage device.

2. The system of claim 1, further comprising the data storage device which includes a cache memory, and wherein the data storage device accesses the table and uses the caching attributes to select files to store in the cache memory.

3. The system of claim 2 wherein the cache memory is non-volatile solid state memory.

4. The system of claim 1 wherein the at least one driver further comprises a device filter driver configured to request caching attributes for the I/O request if caching attributes have not been set, and to send the I/O request and caching attributes to the Advanced Host Controller Interface (AHCI) driver.

5. The system of claim 1, wherein the I/O request comprises an application thread initiating the I/O request and a file to be transmitted between the host device and the data storage device pursuant to the I/O request.

* * * * *